US011991129B2

(12) United States Patent
Homsany

(10) Patent No.: US 11,991,129 B2
(45) Date of Patent: *May 21, 2024

(54) CONTENT-ITEM RELATIONSHIP MESSAGING SYSTEM

(71) Applicant: Dropbox, Inc., San Francisco, CA (US)

(72) Inventor: Ramsey Homsany, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,440

(22) Filed: Aug. 31, 2022

(65) Prior Publication Data

US 2022/0417191 A1     Dec. 29, 2022

Related U.S. Application Data

(60) Continuation of application No. 16/257,129, filed on Jan. 25, 2019, now Pat. No. 11,502,980, which is a division of application No. 13/906,204, filed on May 30, 2013, now Pat. No. 10,243,899.

(51) Int. Cl.
*H04L 51/08* (2022.01)
*H04L 12/18* (2006.01)

(52) U.S. Cl.
CPC .......... *H04L 51/08* (2013.01); *H04L 12/1831* (2013.01)

(58) Field of Classification Search
CPC ............................ H04L 51/08; H04L 12/1831
USPC ...................................................... 709/217
See application file for complete search history.

(56) References Cited

U.S. PATENT DOCUMENTS

| 8,510,646 | B1 * | 8/2013 | Young | G06F 40/169 |
| | | | | 715/275 |
| 10,748,159 | B1 * | 8/2020 | Selinger | G06Q 30/02 |
| 2003/0058277 | A1 | 3/2003 | Bowman-Amuah | |
| 2003/0154191 | A1 | 8/2003 | Fish et al. | |
| 2005/0138192 | A1 | 6/2005 | Encarnacion et al. | |
| 2005/0232423 | A1 | 10/2005 | Horvitz et al. | |
| 2006/0053380 | A1 | 3/2006 | Spataro et al. | |
| 2006/0235737 | A1 | 10/2006 | Fleurant et al. | |
| 2006/0235738 | A1 | 10/2006 | Doyle et al. | |
| 2009/0076887 | A1 | 3/2009 | Spivack et al. | |
| 2010/0184481 | A1 | 7/2010 | Alfasi et al. | |
| 2011/0317885 | A1 | 12/2011 | Leung et al. | |
| 2012/0027256 | A1 | 2/2012 | Kiyohara et al. | |
| 2012/0150971 | A1 | 6/2012 | Bahrainwala et al. | |
| 2013/0047072 | A1 | 2/2013 | Bailor et al. | |
| 2013/0091211 | A1 | 4/2013 | Diab et al. | |

(Continued)

OTHER PUBLICATIONS

Final Office Action from U.S. Appl. No. 16/257,129, mailed Apr. 13, 2020, 12 pages.

(Continued)

*Primary Examiner* — Karen C Tang
(74) *Attorney, Agent, or Firm* — DLA PIPER LLP (US)

(57) ABSTRACT

A message can be selectively provided to users of an online content management service based at least in part on a user relationship between the users and a shared content item. Users having the user relationship associated with the message can be shown the message, where users without the user relationship are not shown the message. For example, a message can be configured to be shown upon the first time a content item is opened by a user, but not on subsequent openings of the content item.

20 Claims, 11 Drawing Sheets

(56) References Cited

U.S. PATENT DOCUMENTS

| | | | |
|---|---|---|---|
| 2013/0097687 A1 | 4/2013 | Storm et al. | |
| 2013/0167207 A1* | 6/2013 | Davis | G06F 21/316 |
| | | | 726/5 |
| 2013/0174223 A1 | 7/2013 | Dykeman et al. | |
| 2013/0174275 A1* | 7/2013 | Micucci | H04L 63/104 |
| | | | 726/28 |
| 2013/0232135 A1 | 9/2013 | Vidra et al. | |
| 2013/0263221 A1 | 10/2013 | Faitelson et al. | |
| 2013/0318347 A1 | 11/2013 | Moffat et al. | |
| 2014/0067934 A1 | 3/2014 | Ware et al. | |
| 2014/0215568 A1 | 7/2014 | Kirigin et al. | |
| 2014/0223099 A1 | 8/2014 | Kidron et al. | |
| 2014/0259113 A1 | 9/2014 | Harris et al. | |
| 2014/0304836 A1 | 10/2014 | Velamoor et al. | |
| 2014/0310351 A1 | 10/2014 | Danielson et al. | |
| 2015/0199533 A1* | 7/2015 | Chou Fritz | G06F 21/6218 |
| | | | 715/781 |

OTHER PUBLICATIONS

Notice of Allowance from U.S. Appl. No. 16/257,129, mailed Jul. 12, 2022, 7 pages.

* cited by examiner

2

CONTENT-ITEM RELATIONSHIP MESSAGING SYSTEM

CROSS-REFERENCE TO RELATED APPLICATION

This application is a continuation of U.S. patent application Ser. No. 16/257,129, filed Jan. 25, 2019, which is a divisional application of U.S. patent application Ser. No. 13/906,204, filed May 30, 2013, now U.S. Pat. No. 10,243,899, issued Mar. 26, 2019, which are incorporated by reference in their entireties.

BACKGROUND OF THE INVENTION

The present disclosure relates generally to online content management services and in particular to selectively providing messages from such services to a user based on a relationship between the user and a content item in an online content management service.

Online content management services allow users to access and manage content across multiple devices using the Internet. In a typical online content management service, a user establishes an account with the service provider and associates various content items with the account. For example, some online content management services may allow the user to store content items (including, but not limited to, text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users may also be able to receive updates based on activity of other users; for instance, in a social network, status updates or other content items posted by one user can be propagated to other users who have indicated interest in receiving them.

With the proliferation of mobile computing devices, a user can now communicate about content items from a variety of clients, such as web browsers, desktop application programs, and mobile-device apps. Project membership can be dynamic with people leaving and joining projects when needed. Keeping all of a user's communications organized and/or properly addressed can present challenges for the online content management service provider.

BRIEF SUMMARY OF THE INVENTION

Certain embodiments of the present invention relate to selecting messages to deliver to a user based on a user relationship of a user to a content item. When users access a shared content item from an online content management service, the content item can be augmented with a message that is selected based on the user's relationship to the content item. For example, different messages can be selected based on whether the user is a member of a group related to the content item, whether the user has previously accessed and/or edited the content item, what level of access the user has been granted to the content item (e.g., read-only vs. modify access). The message may be displayed within the content item (e.g., in a designated message area), displayed alongside a preview of the content item, and/or sent to the user through a messaging protocol such as email or instant messaging. Associating a message with a content item and a relationship to that item provides a way to keep information about content along with the content, while providing context-relevant messages to different audiences.

The messaging system can customize a content item for a user by inserting a message within a message area of a content item based on a relationship between the user and the content item. For example, an online content management service can track interactions with a content item. A message can be set to display upon the first opening of a document by a user. Subsequent openings of the document by the user can result in no message being displayed.

The messaging system can also associate a message with a content item and restrict access to the message based on a relationship between a user and the content item. For example, a user of an online content management service can store a message about a content item, such as a word processing document, to be displayed with the content item. The user can than choose to restrict the message to only display to other users who are in the same company as the user and have editing privileges for the content item.

The messaging system can display messages in addition to a content item based on a relationship between the user and the content item. For example, a user can store a message about a group of content items in a folder by selecting the folder and selecting an option to attach the message to the folder. The message can be further customized to display for those users who have a relationship of having accessed a particular set of content items in the folder. When a second user who matches the relationship views the folder, a message area containing the message can also display along with the folder contents. The display of messages with content items provides a way to organize messages with content items that are the subject of the message. In another example, a message can be customized to pop-up when a content item name is hovered over by the mouse or clicked on. The content of the message can be customized according to a user relationship to the content item.

The messaging system can also modify the display of a document based on a relationship between the user and the content item. For example, a redline markup version of the document can be shown to a user that had previously viewed the document to show updates, while a clean version can be shown to a user who has not yet viewed the document. In another example, an executive can edit a document, but limit visibility of the edits to those tasked with legal review. While an internal legal team can see the executive's comments, others who access the document can see a clean version.

The messaging system can select a group of users to receive a conventional message based on a relationship between each user and a content item. For example, a user can select to send a message to other users who have not viewed a content item. The message can be sent through conventional messaging technologies, such as email, text messaging or social media. In some embodiments, the recipient of the message may select the medium in which the message arrives.

DETAILED DESCRIPTION OF THE INVENTION

Certain embodiments of the present invention relate to selectively providing messages to clients based on a relationship between the user and a content item in an online content management system. A user relationship to a content item can be based on user interactions with the content item, relationships to other users and/or relationships to other content items. Using the relationship, a messaging server of an online content management service can determine which users receive the message. The message itself may be displayed inside a content item, alongside a preview of a content item and/or sent to a user through conventional or other messaging protocols.

For example, a sales manager can create a message that is displayed to users that access a pricelist document that prices will go up in March. The sales manager can select the pricelist document in an online content management service and select an option to add a message. The sales manager can select a relationship of having access to the pricelist document. Using a text editor, the sales manager can compose the message. The sales manager can select an option to have the comments appear next to the document and save the message. When a sales person with access to the pricelist document accesses the document, a messaging system of the online content system causes the message of the sales manager to also display. However, those with read access that access the contract document are not shown the CEO's comments.

Examples of user relationships can include user membership in a group related to a shared content item, user access permissions to the content item, prior user interactions with the content item or triggering a message from an interaction with a shared content item. Other examples of relationships are described below.

Figure 1:
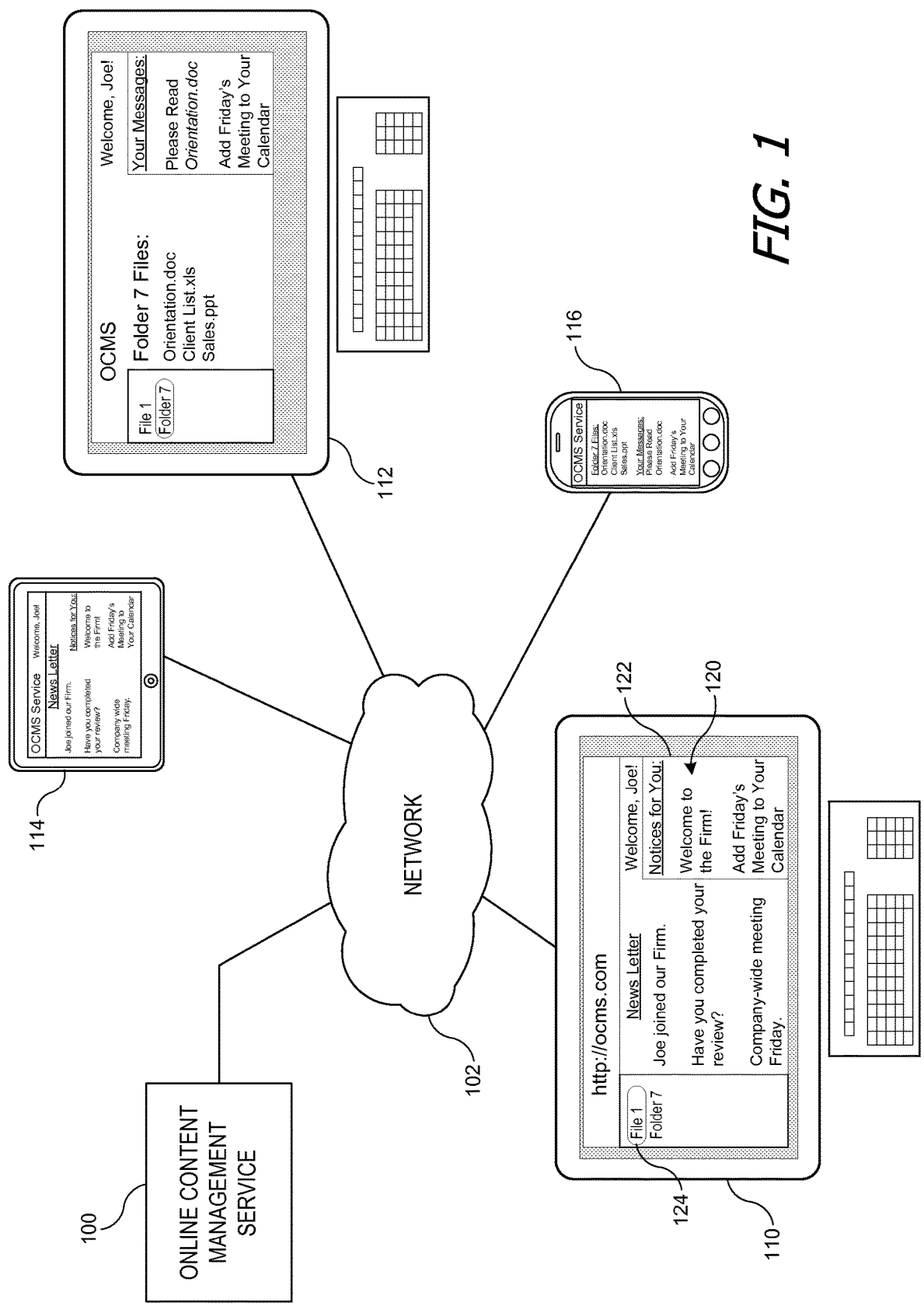
FIG. 1 shows clients accessing a shared content management service according to an embodiment of the present invention.

FIG. 1 shows clients accessing an online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via a network 102, such as the Internet. An online content management service can be implemented by a shared content management system.

Users can access online content management service 100 by operating various clients 110, 112, 114, 116. As used herein, a "client" refers generally to a combination of computer hardware and software that enables a user to interact with online content management service 100. For example, web client 110 can be a desktop or laptop computer executing a web browser (which can be, e.g., Internet Explorer® (a product of Microsoft Corp.), Google Chrome® (a product of Google Inc.), Safari® (a product of Apple Inc.), or similar software) that communicates with online content management service 100 using web protocols such as HTTP (Hypertext Transfer Protocol). Application client 112 can be a desktop or laptop computer executing an application program provided by the provider of online content management service 100. In some instances where the online content management service provides access to files, the application program can allow files hosted on a server to appear to exist within a filesystem structure associated with the client computer's operating system. It should be noted that in some instances, the same client computer can execute both a web browser and a desktop application program; accordingly, it is to be understood that a single physical device can implement one or more clients.

Other examples of clients include mobile devices, e.g., tablet computer 114 and mobile phone 116, which can execute application programs (also referred to as "apps") that communicate with online content management service 100. At various times, a user can be interacting with one or more of clients 110, 112, 114, 116.

In some embodiments, online content management service 100 can provide messaging between clients based on a user relationship between a user and a shared content item. As used herein, a "message" can include any type of content storable in the online content management service. Examples of messages include: text, documents, photographs, audio, transcripts, spreadsheets, presentations and/or video. Messages can be associated with a content item for delivery to clients operated by users who match a user relationship criterion. For example, a message can be attached to an image such that the first time the image is retrieved by a user after edits have been performed on the image, a message notifying the user that the image has changed is also displayed. In another example, recipients of an email message can be selected from a group of users based on having accessed a particular file in the online content management service. Examples of user relationships to a content item include prior interactions of the user with a content item, access permissions to the content item, roles shared with other users who have access to the content item, triggering actions performed by the user on the content item or other associations between a content item and a client and/or user. A user can create a message that targets a subset of a set of users associated with a content item using a relationship of the subset of users to the content item.

For example, a user can create a welcome message 120 that states "Welcome to the Firm!" and can attach the welcome message 120 to "File 1" 124, which is a newsletter that has a designated message area 122. The user can associate the welcome message 120 with users that have an account age of less than 30 days. Web client 110 can subsequently access "File 1" 124 via a user account that has been created in the last 10 days. Display of "File 1" 124 on web client 110 can include displaying the welcome message 120 in designated message area 122 based on the age of the account and access of the content item.

In another example, a sending user can create a message to other users that have a relationship defined as having edited a document. The message may warn that the document will become read-only as of a certain date. The message can be attached to the folder containing the document. When a second user views the folder, a messaging server of the content management service can determine to display the message the second user based on prior edits to the document by the receiving user. When a third user views the folder, the messaging server of the content management service can determine not to display the message to the second user based on a lack of prior edits to the document by the receiving user.

A message can take multiple forms. For example a message can include content for display near to a content item, in a margin of a content item, inside a content item or even markup A message can be comments in a document with limited visibility. For example, a company CEO can create comments in a contract document that are only displayed to people that can edit the contract document. The CEO can select the contract document in an online content management service and request to add comments to the document with a limited visibility. The CEO can select to restrict display of the comments to users having a relationship of an editor of the contract document. Using a text editor, the CEO can add comments to the contract document. The CEO can select an option to have the comments appear in-line in the document and save the comments. When an editor of the contract document accesses the document, a messaging system of the online content system causes the contract document to also display the comments provided by the CEO. However, those with read access that access the contract document are not shown the CEO's comments.

As used herein, attached means having a defined association such that retrieval of a content item causes selective retrieval of an attached message. The defined association can be implicit, such as through shared storage of a content item and a message, or explicit, such as through unique references of a message to a content item. A message attached to a document can be represented, for example, by a metadata object as described below. The message and the defined associations can also be in separate objects, such as may be encountered in a relational database junction table. For example, messages and content items can have a many to many relationship. A message can be attached to many content items and a content item can have many messages.

Figure 2:
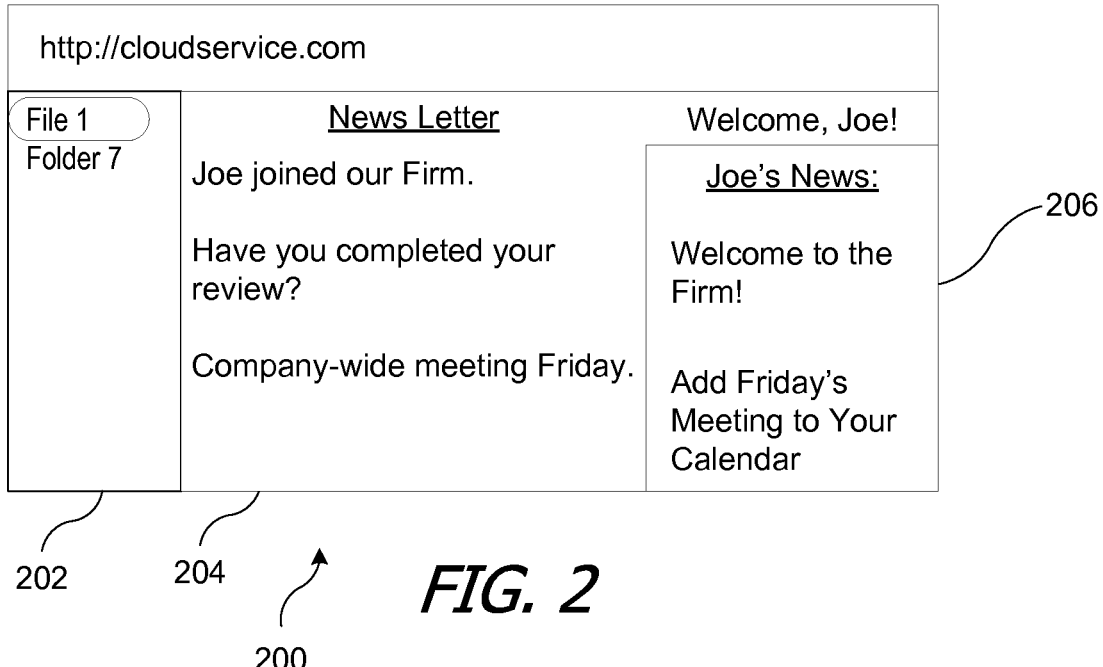
FIG. 2 shows an electronic newsletter displayed in a browser according to an embodiment of the present invention.
Figure 3:
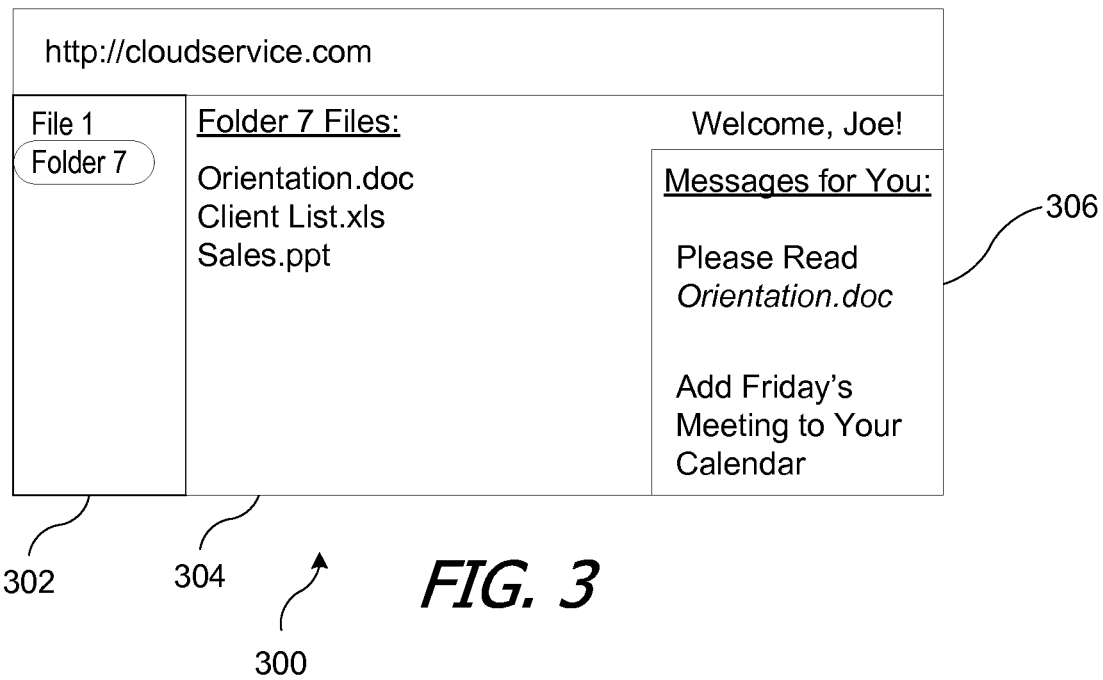
FIG. 3 shows a folder view displayed in a browser according to an embodiment of the present invention.
Figure 4:
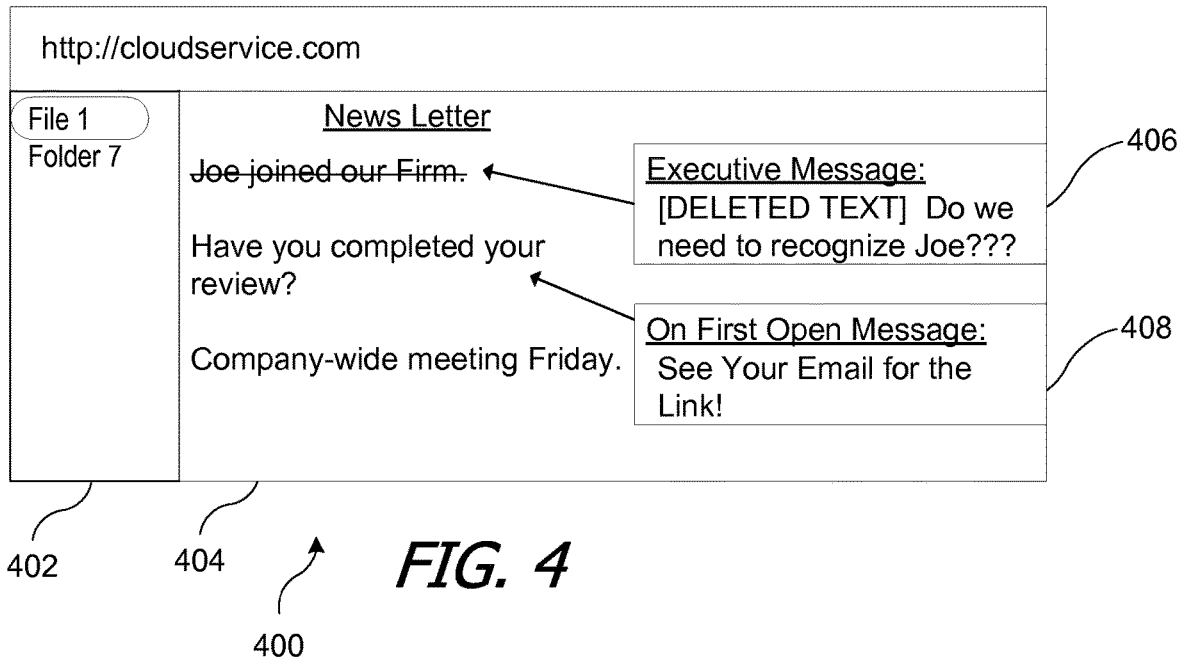
FIG. 4 shows an alternate view of an electronic newsletter displayed in a browser according to an embodiment of the present invention.
Figure 5:
FIG. 5 shows a content item relationship selection view displayed in a browser according to an embodiment of the present invention.

Further examples of interaction with a messaging server that uses user relationships are described in relation to user interfaces shown in FIGS. 2 to 5 in accordance with embodiments of the invention. FIGS. 2 to 4 show user interfaces that selectively show messages to users. FIG. 5 shows a user interface used in creating messages to show to users. FIG. 2 shows a user interface to a messaging server that inserts a message into a message area of a newsletter content item based on a user relationship with the newsletter content item. FIG. 3 shows a user interface to a messaging server that displays messages that match a user relationship next to a view of a folder content item. FIG. 4 shows a user interface to a messaging server that selectively provides visibility of internal document messages, such as edits, to a content item based on a user relationship to the content item. FIG. 5 shows a user interface to a messaging server that allows a user to send a message to users having a relationship to a content item based on a selection of the relationship.

Turning to FIG. 2, a user interface 200 to an online content management service is shown. The user interface can include a content item selection area 202, a content item display area 204 and a message content area 206 prepared by the creator of the newsletter. In the embodiment shown, a user can access the online content management service through a web browser at a web address. The user can select "File 1" from content item selection area 202. As a result, the online content management service can send a content item preview to content item display area 204. In the embodiment shown, the content item "File 1" is a newsletter. The newsletter can include a message area 206 in which customized messages can be shown based on a user relationship between the user requesting the content item and the content item. Two messages are shown in message area 206 that can be based on the user relationship to the content item. A welcome message is shown and a meeting message is shown.

A first user can create a welcome message to show to new users that open a newsletter, but will not show to other users. The first user can create the welcome message, associate the message to one or more content items and set the message to display for new users, e.g. users are accounts less than 30 days old. The first user can navigate to a message creation user interface. Using the interface, the first user can create a welcome message and submit the welcome message to a messaging server of the online content management service. The messaging server can offer one or more content items to associate with the message. By selecting the newsletter content item, the welcome message may be configured to display in the message area of the newsletter content item. The first user can then select user relationships to the content item which can trigger display of the message. By selecting a relationship of having an account less than 30 days old, the user can set a user relationship of opening the newsletter with an account less than 30 days old. In the user interface 200 shown, a second user can navigate to the newsletter. The welcome message can be shown in the message area of the newsletter, as the second user's account is less than 30 days old.

Within the message area 206, a meeting reminder is also shown. The meeting reminder message can be sourced from a meeting request email or entry, such as though Microsoft Outlook® (a product of Microsoft Corp.), Google Calendar® (a product of Google Inc.), Apple iCal® (a product of Apple Inc.) or similar software. A meeting invitation can be stored in an online content management service as a content item. The meeting invitation can be detected by the online content management service and provided to a messaging server of the content management service to determine invitees. Invitees on the meeting invitation can be associated with a message derived from the meeting invitation. Upon access of an associated content item, the messaging server can cause a meeting reminder to be displayed to users that meet the user relationship of invitee.

It should also be recognized that the operations described may be completed in different orders. For example, creation of a message, selection of a user relationship, and selection of a content item can occur in any order. In some embodiments, a user on a laptop computer can right click on a content item, select an option from a contextual menu to send an email to editors of the content item and compose a message in a pop-up window. A user on a tablet can select a menu option to compose a message, select a content item from a browsing hierarchy, search for pre-defined user relationships, select a user relationship from a search result, compose the message in a composition text-area and touch a button to store the message. The message can display with the content item when accessed by a user having selected the user relationship to the content item.

After a sending user composes a message, attaches a message to a content item and defines a user relationship to the content item, the message can be displayed to users that access the content item and have the defined user relationship. In FIG. 3, a message displays in a user interface 300 as a result of a user that matches the defined client relationship accessing the content item. A user interface 300 to an online content management service is shown displaying a folder content item with messages based on user relationships. The user interface can include a content item selection area 302, a content item display area 304, and a message pane 306. In the embodiment shown, a user can access the online content management service through a web browser at a web address. The user can select "Folder 7" from content item selection area 302. In response, the online content management service can provide a listing of content items in the folder shown in content item display area 304. A messaging server of the online content management service can determine messages to display based on a user relationship of the user to the folder content item. The messaging server can cause matching messages to be displayed in message pane 306. As shown in FIG. 3, a read request message and meeting reminder message are shown in message pane 306 because they have matched the user relationship to the folder content item.

To create a message, a sending user can attach a message with a user relationship to various content items, including container content items as shown in FIG. 3. For example, a human resources manager can attach a message stating "Please Read Orientation.doc" to "Folder 7" with a defined user relationship of those who have not read "Orientation.doc." When a user views "Folder 7" a messaging server of an online content management service can select the read request message of "Please Read Orientation.doc" because the user has not yet accessed, opened, downloaded, and/or previewed the content item "Orientation.doc."

In the above example, the messaging server can be used to provide a reminder to users that have not yet performed an action on a content item, where the action on the content item is the user relationship to a content item. Other user relationships can include editing a content item, approving changes to a content item, adding a comment to a content item, deleting a content item, modifying a content item, creating a content item, moving a content item, changing access privileges of a content item, replacing a content item or otherwise interacting with a content item. These relationship actions can be based on past actions or triggered upon performing action. A user can base a user relationship to a content item on past actions, such as editing a document, to cause a message to display. The user can also use prospective actions, such as the first opening of a document, to define a trigger for which a message can be displayed.

The meeting reminder message can be attached to the folder content item using the same process described in FIG. 2 or a similar process. The first user can attach the same message to both the "File 1" content item and "Folder 7" content item shown in FIGS. 2 and 3. In another example, a group of content items can be selected by selecting a containing content item, such as a folder, to which a message with a user relationship may be attached. In the example shown, "Folder 7" can be selected as a containing content item. The message with user relationship can be applied to content items within the containing content item. By selecting "Folder 7," the "Orientation.doc," "Client List.xls," and "Sales.ppt" can be attached to the message with user relationship as well.

Turning to FIG. 4, an example of user interface 400 that displays inline and document edits based on a user relationship to a content item. User interface 400 to an online content management service is shown displaying a word processing document content item with messages 406 and 408. The user interface can include a content item selection area 402, a content item display area 404 and inline messages 406 and 408. In the embodiment shown, an executive user has opened a newsletter. The display of the deletion of the text "Joe joined our Firm" has been restricted to executive-level users by a user making the change. A comment in the document, such as the text "Do we need to recognize Joe" can also be attached to the newsletter content item based on an in-company, executive-level user. Users that are not in-company, such as outside counsel, and executive-level, such as a receptionist, would not match the user relationship connected to the message. As such, the message in this embodiment is not displayed.

Message 408 can be displayed based on a triggering action of a first opening of the newsletter by a user. The first open triggering action can be the user relationship between the content item of the newsletter and the user accessing the newsletter. In this embodiment, the messaging server of the online content system does not display the message 408 on subsequent openings of the newsletter content item.

Turning now to FIG. 5, a user interface 500 to an online content management service is shown displaying a folder content item with a relationship selection window 506. The user interface can include a content item selection area 502, a content item display area 504, and relationship selection window 506. A user that desires to selectively send a message to other users that have a relationship to a content item can select the desired content item. For example, a user can select the "Client List.xls" content item in content item display area 504 with a right click. In a resulting context menu (not shown), a user can select a context menu item of "Send Message." A messaging server of the online content management service can display potential relationships from which to choose. Examples of possible relationships are shown in selection window 506. The user can choose a user relationship of a user that created a content item, is granted editing access to a content item, has edited the content item, has not opened the content item, has only accessed the content item once, and/or in-company users that have made edits to the content item. Once the user relationship is selected, a message can be composed. The message can then be attached to the content item and displayed to users that access the content item based on the selected relationship. After submission to the messaging server, when users access the "Client List.xls" content item and match the selected user relationship, the message can be displayed.

Instead of waiting to display a message upon access to a content item, a message can be sent to a user through other channels based on the user's relationship to a content item. The selection of a relationship to a content item and composition of a message can also be used to determine recipients of other messages, such as messages sent through third parties or other messaging services. For example, the messaging server can determine a set of users that have editing permission to the content item. The messaging server can then send a message through email to that set of users. In some embodiments, receiving users can set communication preferences such that a message may be sent through a channel of choice set by the receiving user. Channels can include email, text messaging, social networks, forums, posts, blogs, feeds or other messaging channels, and/or protocols.

The online content management service can attach messages to content items in various ways. For example, messages and/or user relationships can be stored in metadata associated with the content item. When the content item is accessed, a messaging server of the online content management service can review the metadata of the content item to determine whether a user matches the user relationship that causes the message to display. as another example, messages and/or user relationships can be stored in a data structure containing the content item. When the content item is accessed, the data structure can be reviewed for user relationship matches and associated messages.

Figure 6:
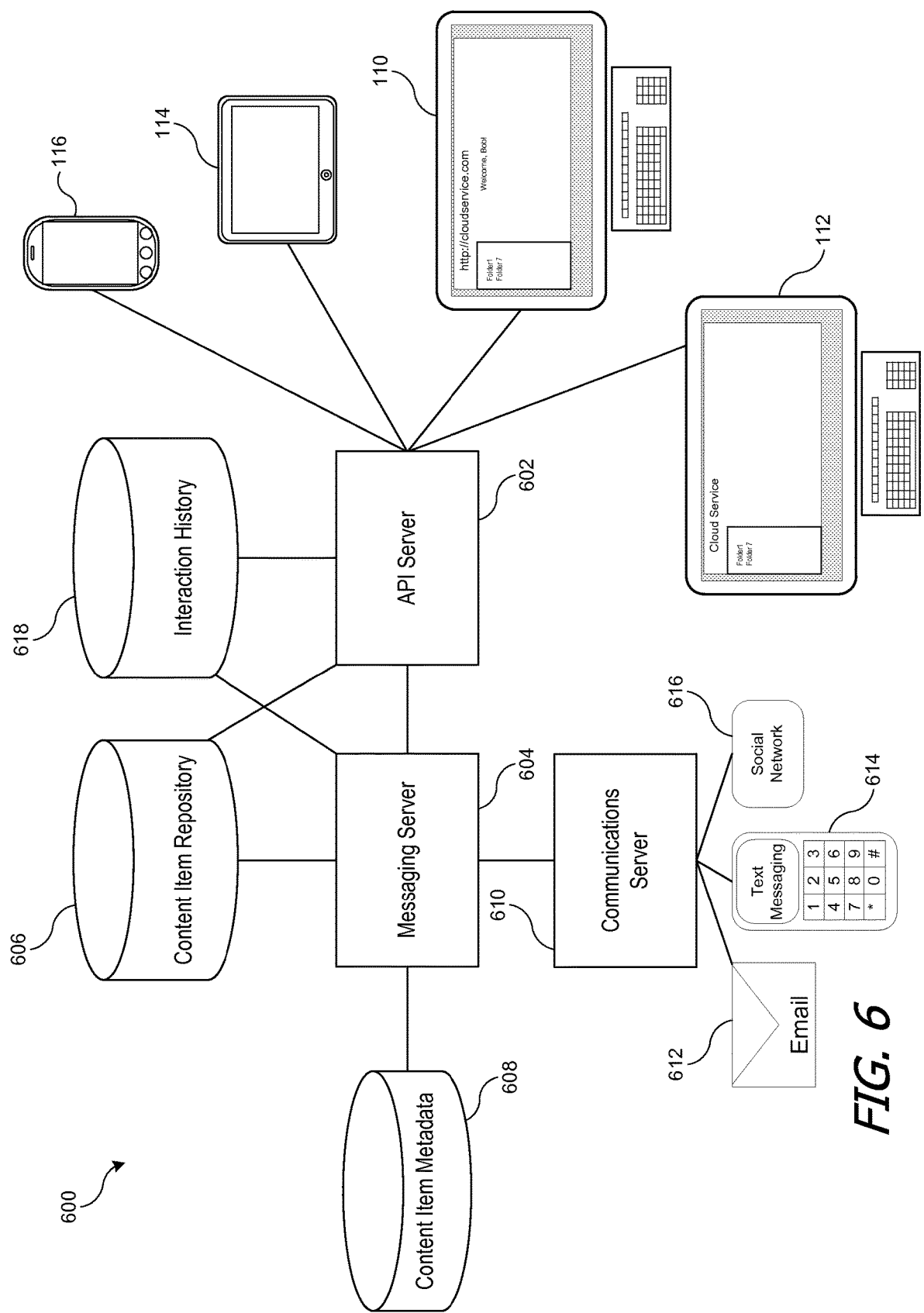
FIG. 6 shows a system for selectively providing messages to clients based on a user relationship according to an embodiment of the present invention.

FIG. 6 shows a system for selectively providing messages to clients based on a user relationship according to an embodiment of the present invention. An online content management service 600 can include provider systems 602, 604, 606, 608, 610, 618, clients 110, 112, 114, 116 and third party services 612, 614, and 616. The provider systems can include an API server 602, messaging server 604 (application programming interface), content item repository 606, content item metadata storage 608, communications server 610, and interaction history store 618. Clients can include web client 110, application client 112, tablet computer 114, and mobile phone 116. Third party services can include email services 612, text messaging service 614, and integration with social network services 616. Client 110, 112, 114 or 116 can contact API server 602 to request a content item. API server 602 can request the content item from the content item repository 606. API server 602 can also provide user information and requested content item information to messaging server 604. Messaging server 604 can retrieve information about the requesting user's user relationship to the content item from content item metadata storage 608, messages associated with the content item and user relationships associated with the messages. messaging server 604 can then determine whether any messages match the user's user relationship to the content item. If a message does match the user's user relationship to the content item, the message can be returned to API server 602 for delivery to client 110, 112, 114 or 116.

API server 602 can also receive a request to send an external message to users that have a user relationship to content item. As used herein, external message means content sent through a medium or channel other than presentation through a client interface of the online content management service. API server 602 can send selected relationship information, a content item identifier and message content to messaging server 604. Using the relationship information and content item identifier, messaging server 604 can identify recipients of the message. Messaging server 604 can provide communications server 610 with recipient information and the message content to send to the recipients. Communications server 610 can then send the message content via messaging services such as email 612, text messaging services 614, and/or social network services 616.

API server 602 can receive a request to attach a message to a content item for display to users having a specified relationship to the content item. API server 602 can send the relationship information, an identifier of the content item, and the message content to messaging server 604. Using the relationship information and content item identifier, the messaging server can store the message in association with the user relationship in the content item's metadata. When a user requests a content item, messaging server 604 can refer to the requested content item's metadata to determine if the user matches a user relationship to the content item that is associated with a message. If so, the associated message can be sent for display, along with the content item.

API server 602 can perform other functions of the online content management service. For example, API server 602 can provide content items from the content item repository upon request. API server 602 can also modify content items in the content item repository based on authorized user requests. Interactions by users with content items can also be stored in interaction history store 618 by API Server 602. Messaging Server 604 can examine stored interactions to determine user relationships that occur between a user and a content item. The determined relationships can be used to determine whether a user receives a message when accessing a content item. In some embodiments, these relationships can be stored in content item metadata 608.

Messaging server 604 can act asynchronously or synchronously with the display of the content item. In one asynchronous example, a content item can be sent for display while messaging server 604 determines whether the requesting user matches a user relationship of any messages attached to the content item. This asynchronous example can result in a message that is displayed after a content item is displayed. In another asynchronous example, the message can be processed before the content item and displayed before the content item is displayed. In a synchronous example, the content item and any associated messages are sent together for display. In some synchronous embodiments, the content item and associated message are combined before reaching a client by server-side processing. In other synchronous embodiments, the content item and associated message are combined at the client.

Figure 7:
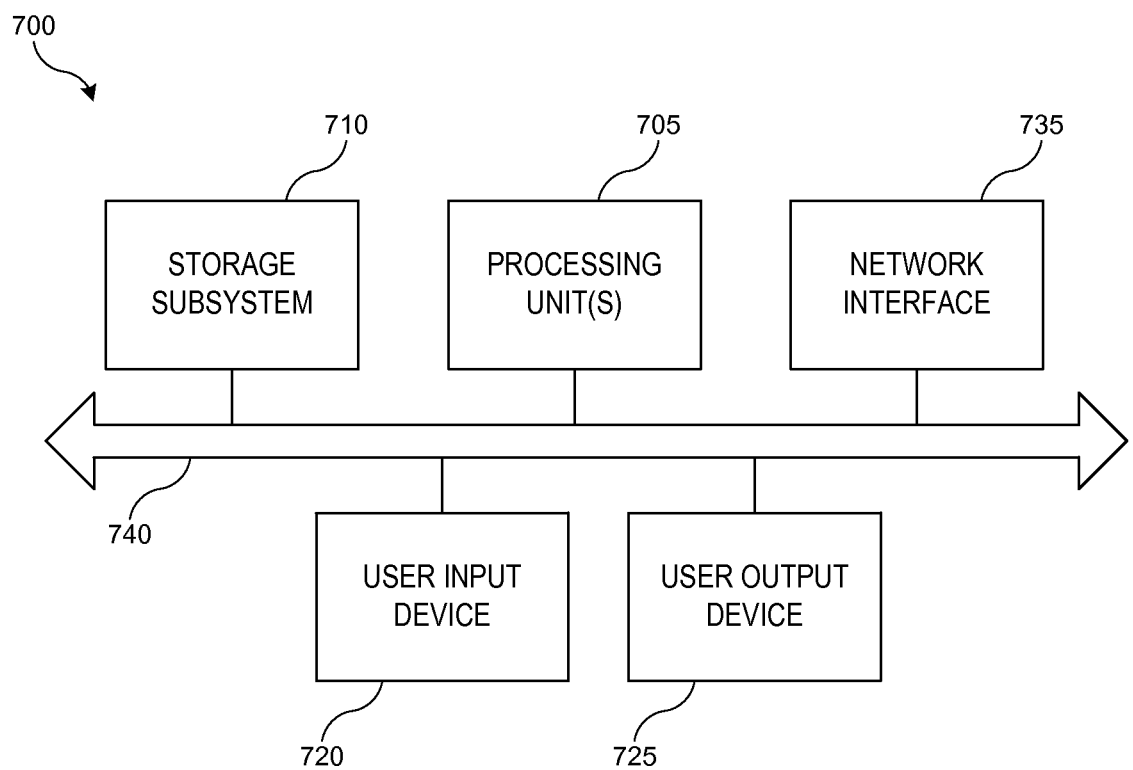
FIG. 7 shows a simplified block diagram illustrating a representative computer system.

Various operations described herein can be implemented on computer systems, which can be of generally conventional design. FIG. 7 is a simplified block diagram illustrating a representative computer system 700. In various embodiments, computer system 700 or similar systems can implement a client (e.g., any of platforms 110, 112, 114, 116) or a server (e.g., messaging server 604).

Computer system 700 can include processing unit(s) 705, storage subsystem 710, input devices 720, output devices 725, network interface 735, and bus 740.

Processing unit(s) 705 can include a single processor, which can have one or more cores, or multiple processors. In some embodiments, processing unit(s) 705 can include a general-purpose primary processor as well as one or more special-purpose co-processors such as graphics processors, digital signal processors, or the like. In some embodiments, some or all processing units 705 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 705 can execute instructions stored in storage subsystem 710.

Storage subsystem 710 can include various memory units such as a system memory, a read-only memory (ROM), and a permanent storage device. The ROM can store static data and instructions that are needed by processing unit(s) 705 and other modules of electronic device 700. The permanent storage device can be a read-and-write memory device. This permanent storage device can be a non-volatile memory unit that stores instructions and data even when computer system 700 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 705 need at runtime.

Storage subsystem 710 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 710 can store one or more software programs to be executed by processing unit(s) 705, such as an operating system, a browser application, a mobile app for accessing an online content management service, a desktop application for accessing the online content management service, and so on. "Software" refers generally to sequences of instructions that, when executed by processing unit(s) 705 cause computer system 700 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 705. Software can be implemented as a single program or a collection of separate programs or program modules that interact as desired. From storage subsystem 710, processing unit(s) 705 can retrieve program instructions to execute and data to process in order to execute various operations described herein.

A user interface can be provided by one or more user input devices 720 and one or more user output devices 725. Input devices 720 can include any device via which a user can provide signals to computing system 700; computing system 700 can interpret the signals as indicative of particular user requests or information. In various embodiments, input devices 720 can include any or all of a keyboard, touch pad, touch screen, mouse or other pointing device, scroll wheel, click wheel, dial, button, switch, keypad, microphone, and so on.

User output devices 725 can include any device via which computer system 700 can provide information to a user. For example, user output devices 725 can include a display to display images generated by computing system 700. The display can incorporate various image generation technologies, e.g., a liquid crystal display (LCD), light-emitting diode (LED), including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 725 can be provided in addition to, or instead of, a display. Examples include indicator lights, speakers, tactile "display" devices, printers, and so on.

Network interface 735 can provide voice and/or data communication capability for computer system 700. In some embodiments, network interface 735 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 735 can provide wired network connectivity (e.g., Ethernet) in addition to, or instead of, a wireless interface. Network interface 735 can be implemented using a combination of hardware (e.g., antennas, modulators/demodulators, encoders/decoders, and other analog and/or digital signal processing circuits) and software components.

Bus 740 can include various system, peripheral, and chipset buses that communicatively connect the numerous components of computing system 700. For example, bus 740 can communicatively couple processing unit(s) 705 with storage subsystem 710. Bus 740 can also connect to input devices 720 and output devices 725. Bus 740 can also couple computing system 700 to a network through network interface 735. In this manner, computing system 700 can be a part of a network of multiple computer systems (e.g., a local area network (LAN), a wide area network (WAN), an intranet, or a network of networks, such as the Internet).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 705 can provide various functionality for computing device 700. For example, in a mobile computing device, processing unit(s) 705 can execute an operating system and an app to communicate with online content management service 100. In a desktop computing device, processing unit(s) 705 can execute an operating system and a desktop application program that presents an interface to online content management service 100; in some embodiments, this interface can be integrated with an interface to a filesystem maintained by the operating system. In some embodiments, processing unit(s) 705 can execute a browser application that provides the ability to retrieve and display content items from sources such as online content management service 100 (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on.

In some embodiments, computer system 700 or a similar system can also implement API server 602, messaging server 604, content item repository 606, content item metadata storage 608, and/or communications server 610. In such instances, a user interface can be located remotely from processing unit(s) 705 and/or storage subsystem 710; similarly, storage subsystem 710, or portions thereof, can be located remotely from processing unit(s) 705. Accordingly, in some instances, various components of computer system 700 need not be physically located in any particular proximity to each other.

It will be appreciated that computer system 700 is illustrative and that variations and modifications are possible. Computer system 700 can have other capabilities not specifically described here (e.g., mobile phone, global positioning system (GPS), power management, one or more cameras, various connection ports for connecting external devices or accessories, etc.). Further, while computer system 700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus, including electronic devices implemented using any combination of circuitry and software.

As described above, messages can be attached to content items and associated with user relationships to content items. An example taxonomy of user relationships 800 can be seen in FIG. 8, but is not exhaustive in scope. User relationships 800 can be subdivided into status relationships 802 or interaction 804 relationships with a content item. Status relationships 802 can be indicative of positions and permissions of a user. Status relationships 802 can be further subdivided into status relative to a content item status 806 or a position status 808. Content item status 806 can include permissions granted to a user, such as reading permission 810, a group of author permissions 812, and/or editing permissions 814, among others. Position status 808 can include broader roles relative to the content item, such as a role relative to a group of content items or relative to an author of the content item. Examples of position status 808 can include a user accessing a content item being on the same company team 816 as the author, a user accessing the content item being in the same company 818 as the author and/or a user accessing the content item being external 820 to the company of a second user.

A second group of user relationships 800 can be based on user interaction 804 with content items. Interactions 804 can be based on prior actions 822 or trigger upon future actions 824. Prior actions 822 can include whether a user has read 826, edited 828 or commented 830 on a content item in the past. Future actions 824 can include triggering a relationship upon a first opening 832 of a content item by a user, upon a content item changing 834 since a last viewing by the user or upon the user changing the content item 836.

These relationships once associate with a content item, can be used to determine whether an attached message should be displayed when that content item is accessed or sent when the user relationship has been satisfied. It should be recognized that this taxonomy is not limited to the structure or specific relationships shown, and the set of defined relationships can be altered as desired.

A message can be attached to a content item and associated with a relationship, for example, by including content reference information in metadata for the message. An example of a metadata structure linking a message to a relationship and a content item can be seen in FIG. 9. The metadata can contain fields 902, including relationship fields 910, sequence fields 912, and content fields 914. Examples of metadata objects 904, 906, and 908 implementing these fields are shown in the numbered columns. Relationship fields 910 can link a message to a content item and one or more relationships. Relationship fields 910 can include a comment type, target object, and relationship to the target object. A comment type field can be used to determine a way to display the comment. For example, a redline can be displayed inline in the content item, while a notice can be displayed in a message pane or message area. A target object field can name one or more content items that are associated with the message. When a content item is accessed, the messaging server can determine which messages are evaluated for user relationships by selecting metadata having a matching target object to the accessed content item. A relationship field can define the relationship of a user to the target object. After selecting one or more metadata objects 904, 906, and 908, the messaging server can evaluate the relationship field for a matching user relationship between the content item and the user.

Sequence fields 912 can include a serial number field, timestamp field and expiration time field. The serial number field can be used as a unique identifier for the message. The messaging server can use the unique identifier field as an individual reference to the message. A timestamp field can provide information about the age of the message. An end time field can define an automatic expiration of the message, such that even if a user matches a user relationship to a target object, the message will not be shown after the expiration time. A null value in the end time field can be used to represent a message having no expiration time. In some embodiments, authors of message can choose whether to set an expiration time.

Content fields 914 can include the message content, an identifier of a user that created the message and a status of the message. The message field can reference message content stored in other systems. Depending on the implementation of the system, the message can include markup in addition to the text, such as HTML markup, Open Document Format markup or Rich Text Format markup. The origin user field can identify an author of the message. The author can be the last user to edit and/or a creator of the message content. A status field can be used to determine what should be done with a message having a matching user relationship to a user. Messages associated with the Active status field can be sent for display when a user has a matching user relationship to the target object. In some embodiments, messages having a paused status or expired status are not shown.

In one example, a client (e.g., client 112 of FIG. 6) can request a content item of "Newsletter.doc" from API Server (e.g., API Server 602 of FIG. 6). API Server 602 can notify messaging server (FIG. 2, 604) of the request. Messaging server 602 can retrieve one or more metadata objects 904 that have a target object field in relationship fields 910 that matches the content item requested by client 112. In this example, the user has opened the "Newsletter.doc" for the first time, and messaging server 602 can determine that the relationship field of "First Open" matches a user relationship of the user to the "Newsletter.doc." As the relationship field match is confirmed, the messaging server can check for "Active" in the status field and no expiration in the End Time field to determine that the message can be displayed. As the message is active, the messaging server can determine the type of message to prepare from the Type ID field. As the Type ID field indicates a comment, the messaging server can retrieve the "Newsletter.doc" from content item repository (e.g., content item repository 606 of FIG. 6) and insert message content from the message field into "Newsletter.doc" as comments. The "Newsletter.doc" content item with comments can then be returned to client 112.

Message display can depend on more than one user relationship. A message creator can restrict access to groups of people by using logic and/or set theory, including logical operators such as "OR" and/or "AND." By using these operators, a message sender can, for instance, require a user to have a first relationship to a first content item and a second relationship to a second content item before a message is allowed to be displayed on a third content item. For example, a sales manager can attach a discount message to a sales document. The sales manager can choose to limit the display of the discount message to users who have a first user relationship of editing privileges to the sales document and also a second user relationship of access to the customer list document.

Figure 8:
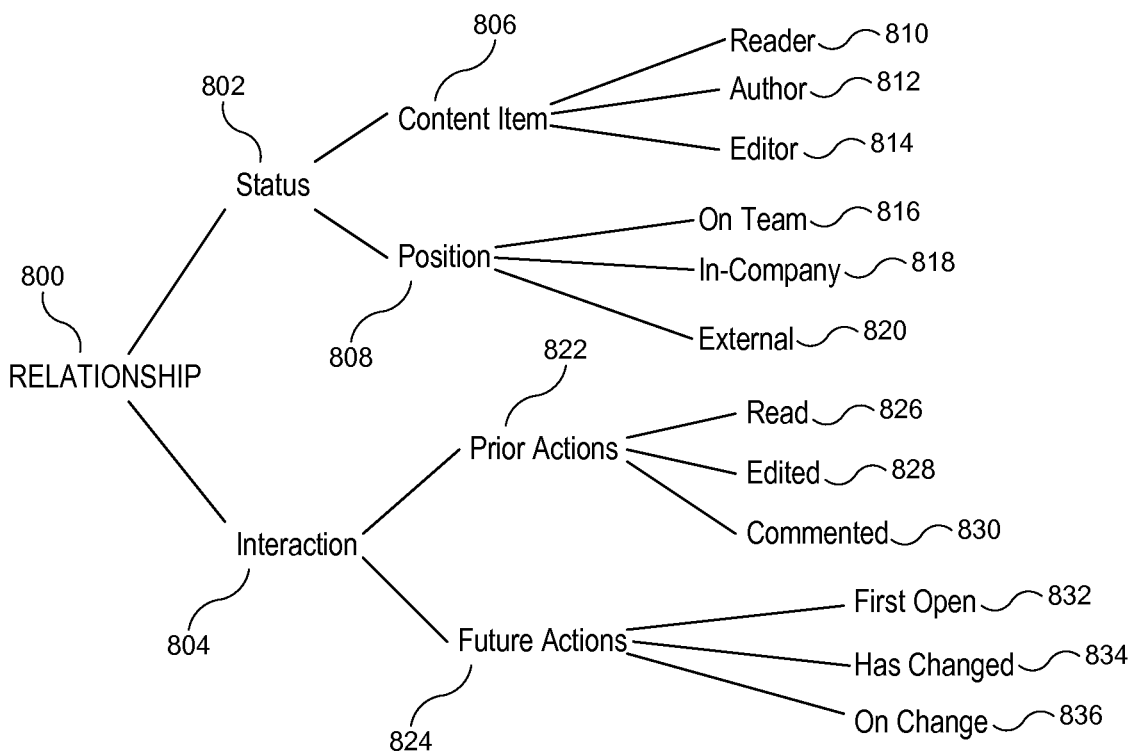
FIG. 8 shows a relationship taxonomy according to an embodiment of the present invention.
Figure 9:
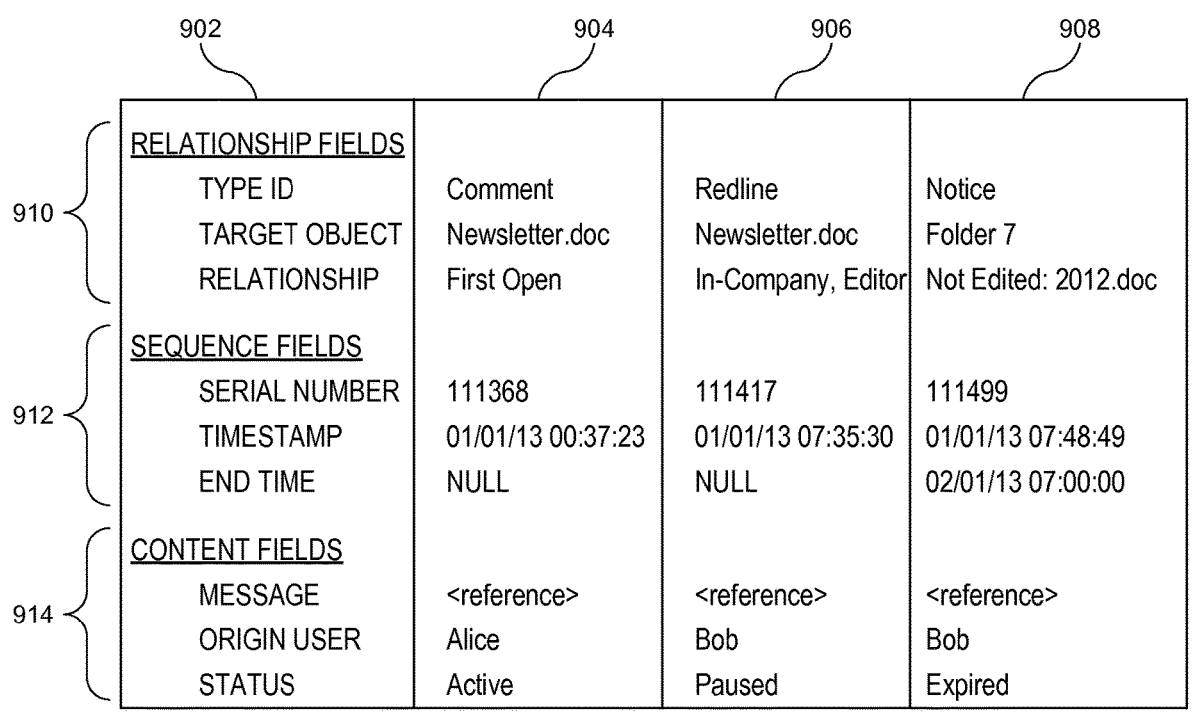
FIG. 9 shows examples of message records according to an embodiment of the present invention.

The data structures of FIGS. 8 and 9 are illustrative, and variations and modifications are possible. A metadata object can include any number of fields and can have more or fewer fields than shown. Similarly, the number and content of fields of a message can be different from that shown.

Using data structures such as those of FIGS. 8 and 9, system 600 of FIG. 6 can selectively provide messages to clients that have a user relationship to a content item. Examples of processes that can be implemented at API server 602, messaging server 604, content item repository 606, content item metadata storage 608, communications server 610, and clients 110, 112, 114, 116 to provide content-item messaging server will now be described.

Figure 10:
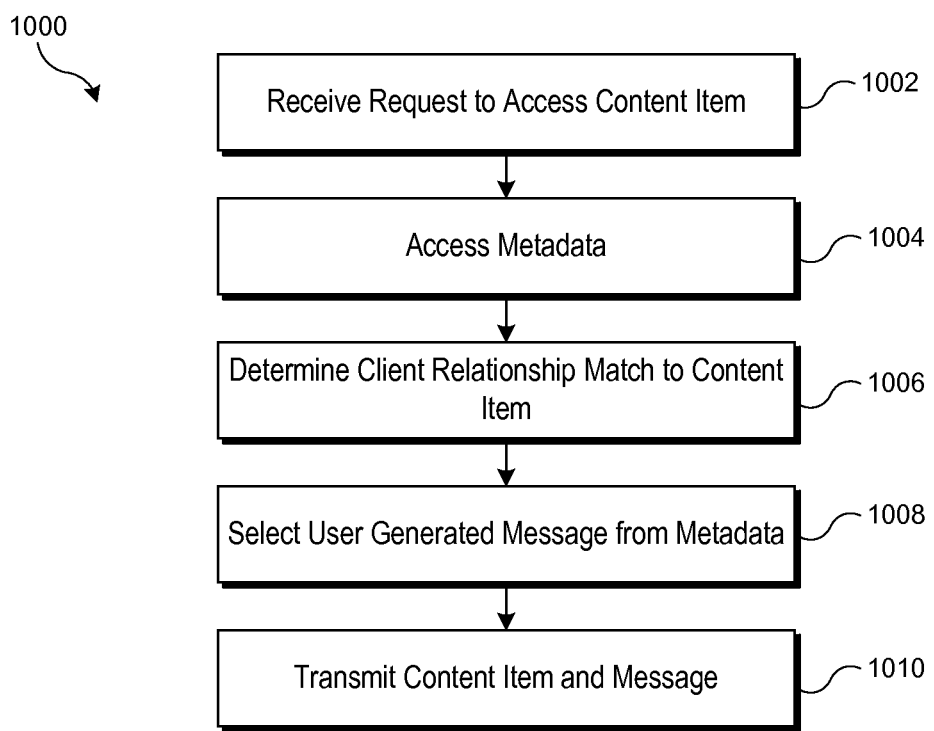
FIG. 10 shows a flow diagram of a process for providing messages to users with a content item according to an embodiment of the present invention.

FIG. 10 is a flow diagram of a process 1000 for selectively providing messages to clients that access a content item based on a user relationship to the content item. Process 1000 can be implemented on one or more servers, such as API server 602 and messaging server 604.

At block 1002, messaging server 604 can receive a request to access a content item. The request can be, e.g., a notification from API server 602 that a client 112 has requested the content item. At block 1004, messaging server 604 can access the metadata to determine which messages are attached to the requested content item. The messaging server can request metadata objects that refer to the content item (or are attached to the content item in other embodiments). from content item metadata storage 608. At block 1006, a user relationship defined in the metadata objects can be matched to the requesting user and the content item. For example, if the metadata object defines a relationship as being an editor of the content item and the user has editing permissions to the content item, there is a match. If there is a successful user relationship match, then at block 1008, the messaging server 604 can select the message for delivery to the requesting client. The message can be referenced from a message field in the metadata object that was matched to the user relationship. In block 1010, the messaging server 604 can then cause the content item to be sent with the message. For example, the messaging server can cause the message to be displayed in a messaging pane next to a preview pane of the content item. The message can also be embedded in the content item and transmitted to the requesting client, such as in redline or comment form.

If more than one metadata object is retrieved as related to a content item, blocks 1006 and 1007 can be repeated for each metadata object. Each metadata object can be evaluated for whether the user relationship match is satisfied. Then, the messages for which the relationship match is satisfied can be transmitted with the content item and provided to the requesting client. In some embodiments, the messages can be combined with the content item prior to transmission.

Figure 11:
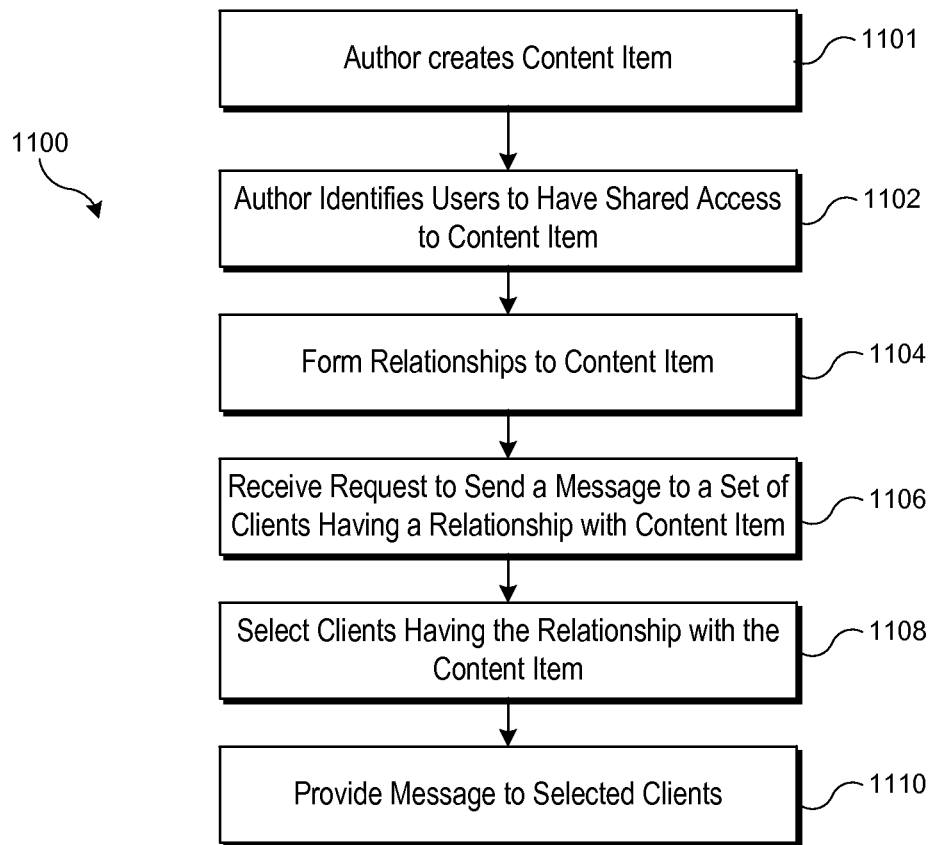
FIG. 11 shows a flow diagram of a process for selecting users to receive a message based at least in part on a relationship to a content item according to an embodiment of the present invention.

Message recipients can be chosen by their relationship to a content item. For example, recipients of an email can be defined as those users that have not yet opened "Orientation.doc." FIG. 11 is a flow diagram of a process 1100 for selectively choosing recipients of a message based on a recipient's user relationship to a content item. Process 1100 can be implemented on one or more servers, such as API server 602, messaging server 604 and communications server 606.

At block 1101, an author creates a content item in the online content management system. For example, the author can upload a newsletter. At block 1102, the author identifies and invites users to have shared access to the content item. For example, the author can invite other users to share access to the content item through the API server 602. At block 1104, user relationships can be formed with the content item. As part of the invitations and interactions of users with the content item through the API server 602, users can develop user relationships with the content item. These interactions and/or relationship data can be stored in an interaction history store, which can later be accessed to determine a user relationship to a content item. At block 1106, the author of the content item or anyone with shared access to the content item can request to send a message to a set of users based on a relationship to the content item. For example, a user who has read-only access to the content item can notice a spelling error in the content item. The user, through his client accessing the API server 602, can choose to compose a message with a recipient list of users that have editing access to the content item. At block 1108, the messaging server 604 can select users that have the requested relationship to the content item. For example, the messaging server 604 can examine records of users that have permission to access the content item. The retrieved user records can then be examined by the messaging server 604 for status or interactions that match the requested editing access to the content item. In block 1110, the message can be sent to the selected users. The messages can be sent through third party services, such as email, text-messaging, and/or social media API's. For example, the message about the spelling error can be received by some editors in their email inbox, other editors by a text-message on their mobile phone and yet other editors can view the message on their social media feed. This form of message addressing can allow a user to notify editors without having to know who they are because the recipients are defined by a user relationship to a content item rather than an identifier, such as an email address.

Figure 12:
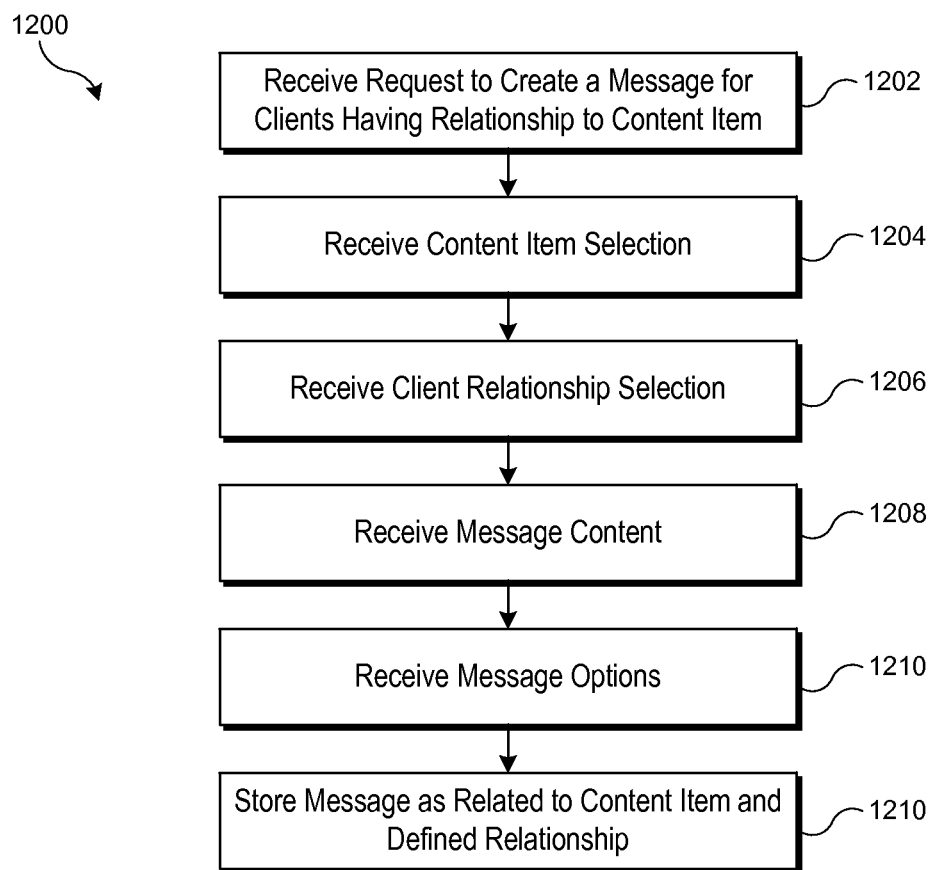
FIG. 12 shows a flow diagram of a process for configuring messages to be provided to users that access a content item according to an embodiment of the present invention.

FIG. 12 is a flow diagram of a process 1200 for configuring a message to be provided to users that access a content item based on a user relationship to the content item. Process 1000 can be implemented on one or more servers, such as API server 602 and messaging server 604.

At block 1202, a request from a client can be received to create a message to provide to users that have a user relationship to a content item. For example, a user through a client can initiate a message construction process by selecting an option to compose a message. In response to the selection, a messaging server can send a message composition user interface. At block 1204, the API server can receive a selection of a content item to which the message will be associated. For example, a user can select a newsletter content item to contain a message. In some embodiments, this selection can be implicitly performed. For example, a user can select a "create message attached to this content item" option while viewing a content item. At block 1206, the messaging server 604 can receive a user selection of a user relationship to the content item. For example, as shown in FIG. 5, a menu of defined relationships can be presented to a user for selection. In some embodiments, multiple relationships can be combined with logical operators (e.g. "and" or "or") to further restrict or broaden the selection. At block 1208, messaging server 604 can receive the message content. The message content can be homogeneous content or heterogeneous content such as combinations of text, markup, video, audio, pictures, and other content. The message content can be configured to be displayed alongside a content item, within a designated area of a content item, within margins of a content item, as markup of a content item, in line with the content of the content item and so on. In one example, the message can be composed by a user editing the content item to produce an altered version of the content item, such as a redline version. At block 1210, messaging server 604 can receive messaging options from the client. Messaging options can include the various options described in conjunction with the metadata described in FIG. 9, including end-time, status, types of message, and other options. For example, selectable options by the user can include whether the message is included in-line with the content item as a comment or separately in a message pane or pop-up window. In block 1210, the message can be stored as related to the content item and for display to users having the selected user relationship. In some embodiments, the message content, options, user relationship and association with the content item are stored in a metadata store with a data structure shown in FIG. 9.

Figure 13:
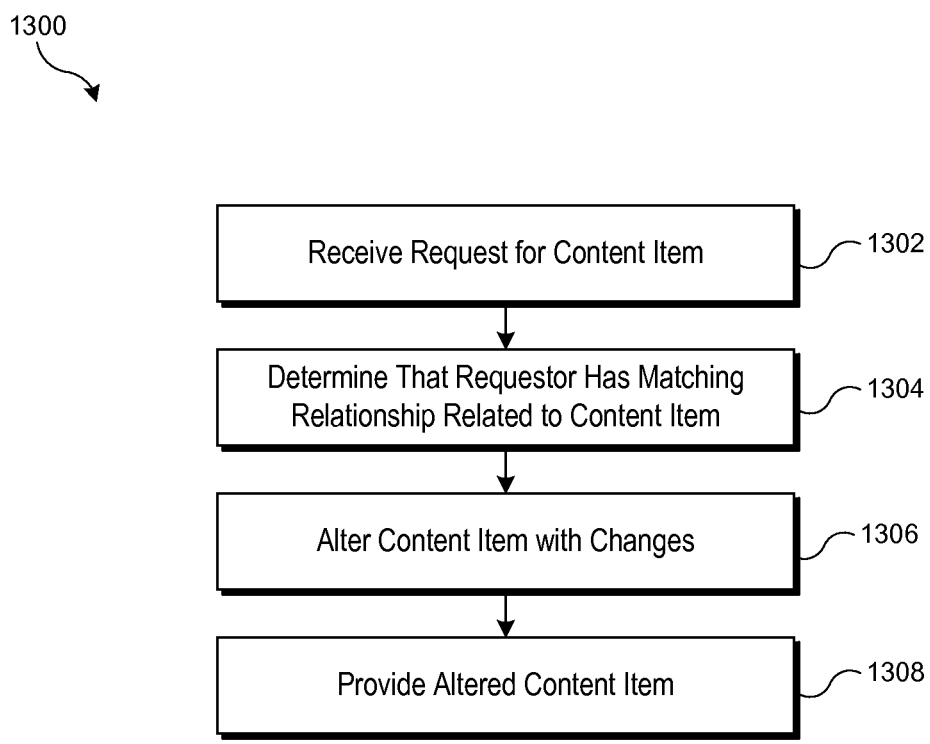
FIG. 13 shows a flow diagram of a process for providing an altered content item to a client based on a user relationship between the user and the content item according to an embodiment of the present invention.

FIG. 13 is a flow diagram of a process 1300 for selectively providing altered content items to clients based on a user relationship to the content item. Process 1000 can be implemented on one or more servers, such as API server 602 and messaging server 604.

At block 1302, messaging server 604 can receive a request to access a content item. The request can be a notification from the API server 602 that a client 112 has requested the content item. At block 1304, a messaging server 604 can determine whether a user requestor matches a user relationship associated with content item. In some embodiments, the user relationship is defined in metadata objects, such as seen in FIG. 9. The messaging server 604 can access the metadata objects to determine which content alterations are attached to the requested content item. The messaging server can request metadata objects from content item metadata storage 608. A user relationship defined in the metadata objects can be matched to the requesting user and the content item. For example, if the metadata object defines a relationship as "editor of the content item" and the user has editing permissions to the content item, there is a match. If there is a successful user relationship match, then at block 1306, messaging server 604 can alter the content item based on the matching metadata. The instructions for altering the content can be from a message field in the metadata object that was matched to the user relationship. In block 1308, messaging server 604 can then cause the altered content item to be sent to the user requestor. For example, the message can be incorporated in the content item and transmitted to the requesting client, such as in redline markup or comment form.

The various workflows and processes described herein can provide users with flexibility in defining recipients of a message and displaying messages. Through interactions with content items, users can self-select their user relationships to content items. Attaching messages to content items for display based on user relationships allows targeted messages while reducing effort that comes with explicitly defining recipients. The display of messages with content items also provides a way to organize messages with content items that are the subject of the message rather than a conventional email inbox that holds varied email messages about multiple subjects.

While the invention has been described with respect to specific embodiments, one skilled in the art will recognize that numerous modifications are possible. For example, the particular events, data structures and platforms described herein are used for purposes of illustration; other events, data structures and platforms can be substituted. Techniques for selectively providing messages to users based on a user relationship can also be modified as appropriate for a particular client.

While the description above has focused on user relationships, it should be recognized that client relationships can also be used in place of or along with user relationships. Relationships that can be used in conjunction with messages and/or content items as described above can include client/client, client/user, user/user, client/content item, user/content item and other combinations of relationships. For example, an information technology staff member can create a set of messages where each message describes what files can be previewed on a specific client device. The staff member can attach the messages to a folder containing a variety of documents. Each message can be defined to only display on a corresponding device alongside the folder user interface. When a first user views the folder on an Android™ (a product of Google Inc.) tablet, the user can see the message that was defined for an Android client. When a second user arrives on an iPhone™ (a product of Apple Inc.), the second user can view the message defined for the iPhone™ device.

As noted above, it is not required that every request for a content item result in a message. Where a request does result in a message, the message can be presented to a user in any manner desired, including an ability for a user to override settings in metadata. For example, a user can cause a comment to be shown in a message pane rather than in-line in the document.

Embodiments described above may make reference to data structures and databases, storage or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   receiving, by a content management system, a first request from a first client device for access to a shared content item in the content management system;
   receiving, by the content management system, a second request from a second client device for access to the shared content item in the content management system, the shared content item accessible to a plurality of users, including a first user of the first client device and a second user of the second client device;
   accessing, by the content management system, a record of interactions of the plurality of users with the shared content item;
   determining, by the content management system, a first user relationship of the first user to the shared content item based at least in part on the record of interactions;
   determining, by the content management system, a second user relationship of the first user to the shared content item based at least in part on the record of interactions;
   producing, by the content management system for the first user, a first altered version of the shared content item in accordance with the first user relationship; and
   producing, by the content management system for the second user, a second altered version of the shared content item in accordance with the second user relationship.

2. The method of claim 1, further comprising:
   accessing, by the content management system, a set of objects associated with the shared content item, the set of objects defining how the shared content item is to be displayed to the plurality of users.

3. The method of claim 1, wherein producing, by the content management system for the first user the first altered version of the shared content item comprises:
   altering the shared content item by removing a portion of content from the shared content item.

4. The method of claim 1, wherein producing, by the content management system for the first user the first altered version of the shared content item comprises:
   adjusting permissions of the shared content item from a first permission level to a second permission level.

5. The method of claim 1, wherein determining, by the content management system, the first user relationship of the first user to the shared content item based at least in part on the record of interactions comprises:
   identifying a membership of the first user to a group of users having the first user relationship to the shared content item.

6. The method of claim 1, further comprising:
   providing, by the content management system, the first altered version of the shared content item via a communication channel in accordance with the first user relationship.

7. The method of claim 1, further comprising:
   updating, by the content management system, the record of interactions to reflect the first request and the second request.

8. A method, comprising:
   receiving, by a content management system, a first request from a first client device for access to a shared content item in the content management system, the shared content item accessible to a plurality of users including a first user of the first client device;
   accessing, by the content management system, a record of interactions of the plurality of users with the shared content item;
   determining, by the content management system, a first user relationship of the first user to the shared content item based at least in part on the record of interactions; and
   providing access, by the content management system to the first client device, to an altered version of the shared content item, wherein the altered version of the shared content item is associated with the first user relationship.

9. The method of claim 8, further comprising:
   accessing, by the content management system, a set of objects associated with the shared content item, the set of objects defining how the shared content item is to be displayed to the plurality of users.

10. The method of claim 8, wherein providing access, by the content management system to the first client device, to the altered version of the shared content item comprises:
    altering the shared content item by removing a portion of content from the shared content item.

11. The method of claim 8, wherein providing access, by the content management system to the first client device, to the altered version of the shared content item comprises:
    adjusting permissions of the shared content item from a first permission level to a second permission level.

12. The method of claim 8, wherein determining, by the content management system, the first user relationship of the first user to the shared content item based at least in part on the record of interactions comprises:
    identifying a membership of the first user to a group of users having the first user relationship to the shared content item.

13. The method of claim 8, wherein providing access, by the content management system to the first client device, to the altered version of the shared content item comprises:
    providing access to the altered version of the shared content item via a communication channel in accordance with the first user relationship.

14. The method of claim 8, further comprising:
    updating, by the content management system, the record of interactions to reflect the first request.

15. A method, comprising:
    receiving, by a content management system, a first request from a first client device for access to a shared content item in the content management system, the shared content item accessible to a plurality of users including a first user of the first client device;

accessing, by the content management system, a record of interactions of the plurality of users with the shared content item;

determining, by the content management system, a first user relationship of the first user to the shared content item based at least in part on the record of interactions;

providing access, by the content management system to the first client device, to an altered version of the shared content item, wherein the altered version of the shared content item is associated with the first user relationship;

altering, by the content management system, the shared content item in accordance with the first user relationship; and sending, by the content management system to the first client device, the altered shared content item.

16. The method of claim 15, further comprising:

accessing, by the content management system, a set of objects associated with the shared content item, the set of objects defining how the shared content item is to be displayed to the plurality of users.

17. The method of claim 15, wherein altering, by the content management system, the shared content item in accordance with the first user relationship comprises:

removing a portion of content from the shared content item.

18. The method of claim 15, wherein altering, by the content management system, the shared content item in accordance with the first user relationship comprises:

adjusting permissions of the shared content item from a first permission level to a second permission level.

19. The method of claim 15, wherein determining, by the content management system, the first user relationship of the first user to the shared content item based at least in part on the record of interactions comprises:

identifying a membership of the first user to a group of users having the first user relationship to the shared content item.

20. The method of claim 15, wherein sending, by the content management system to the first client device, the altered shared content item comprises:

sending the altered version of the shared content item via a communication channel in accordance with the first user relationship.

* * * * *